(12) United States Patent
Jung et al.

(10) Patent No.: US 9,357,605 B2
(45) Date of Patent: May 31, 2016

(54) LED DRIVING APPARATUS AND DRIVING METHOD FOR CONTINUOUSLY DRIVING LED

(71) Applicant: Seoul Semiconductor Co., Ltd., Ansan-si (KR)

(72) Inventors: Hye Man Jung, Ansan-si (KR); Hyun Gu Kang, Ansan-si (KR); Sang Wook Han, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/434,031

(22) PCT Filed: Oct. 7, 2013

(86) PCT No.: PCT/KR2013/008951
§ 371 (c)(1),
(2) Date: Apr. 7, 2015

(87) PCT Pub. No.: WO2014/058196
PCT Pub. Date: Apr. 17, 2014

(65) Prior Publication Data
US 2015/0245427 A1    Aug. 27, 2015

(30) Foreign Application Priority Data
Oct. 8, 2012    (KR) .................. 10-2012-0111211

(51) Int. Cl.
*H05B 37/02* (2006.01)
*H05B 33/08* (2006.01)

(52) U.S. Cl.
CPC .......... *H05B 33/083* (2013.01); *H05B 33/0812* (2013.01); *H05B 33/0824* (2013.01)

(58) Field of Classification Search
USPC .............. 315/185 R, 291, 294, 299, 307, 308
See application file for complete search history.

(56) References Cited

U.S. PATENT DOCUMENTS

| | | | | |
|---|---|---|---|---|
| 8,384,311 | B2* | 2/2013 | Gray | H05B 33/0824 |
| | | | | 315/185 R |
| 8,456,095 | B2* | 6/2013 | Huynh | H05B 33/083 |
| | | | | 315/209 R |
| 8,598,796 | B2* | 12/2013 | Jeong | H05B 33/083 |
| | | | | 315/185 R |
| 9,000,678 | B2* | 4/2015 | Huynh | H05B 33/083 |
| | | | | 315/121 |
| 2011/0248640 | A1* | 10/2011 | Welten | H05B 33/083 |
| | | | | 315/210 |

FOREIGN PATENT DOCUMENTS

| | | |
|---|---|---|
| KR | 10-2010-0107196 | 10/2010 |
| KR | 10-0986815 | 10/2010 |
| KR | 10-1132194 | 3/2012 |
| KR | 10-2012-0032509 | 4/2012 |
| KR | 10-2012-0041093 | 4/2012 |
| KR | 10-1174101 | 8/2012 |

* cited by examiner

*Primary Examiner* — Thuy Vinh Tran
(74) *Attorney, Agent, or Firm* — H.C. Park & Associates, PLC (57) ABSTRACT

Disclosed herein are a light emitting diode (LED) driving apparatus and driving method for continuously driving an LED. According to the present invention, an LED driving apparatus and driving method for continuously driving an LED capable of compensating for a light output of an LED lighting using an energy chargeable and dischargeable element and/or circuit are proposed.

18 Claims, 5 Drawing Sheets

LED DRIVING APPARATUS AND DRIVING METHOD FOR CONTINUOUSLY DRIVING LED

CROSS-REFERENCE TO RELATED APPLICATIONS

This application is the National Stage Entry of International Application No. PCT/KR2013/008951, filed on Oct. 7, 2013, and claims priority from and the benefit of Korean Patent Application No. 10-2012-0111211, filed on Oct. 8, 2012, both of which are incorporated herein by reference for all purposes as if fully set forth herein.

BACKGROUND

1. Field

The present invention relates to a light emitting diode (LED) driving apparatus and driving method for continuously driving an LED, and more particularly, to an LED driving apparatus and driving method for continuously driving an LED capable of compensating for a light output of an LED lighting using an energy chargeable and dischargeable element and/or circuit.

2. Discussion of the Background

A light emitting diode (LED) is generally driven in a direct current driving mode. In a case of the direct current driving mode, there are problems that an alternating current-to-direct current (AC-DC) converter such as a switching mode power supply (SMPS), or the like is necessarily required, the power converter increases cost of manufacturing a lighting fixture, makes miniaturization of the lighting fixture difficult, degrades energy efficiency of the lighting fixture, and shortens a lifespan of the lighting fixture due to a short lifespan of the power converter.

In order to solve the problems of the direct current driving mode described above, an alternating current driving mode of the LED has been proposed (Korean Patent Laid-Open Publication No. 10-2012-0032509, etc.). However, a circuit according to the above-mentioned technology has a problem that a flicker phenomenon in which a user recognizes a flicker of a lighting due to a long non-emitting interval of the LED occurs as well as a problem that a power factor is degraded due to a non-match between an input voltage and a current output from the LED.

In order to solve the problems of the alternating current driving mode of the LED as described above, a sequential driving mode of an alternating current LED has been proposed (Korean Patent Laid-Open Publication No. 10-2012-0041093, etc.). According to the sequential driving mode of the alternating current LED described above, in a situation in which an input voltage is increased over time, a first LED first begins to emit light at Vf1, a second LED is connected in series to the first LED at Vf2 which is a voltage higher than Vf1, such that the second LED begins to emit light, and a third LED is connected in series to the second LED and the first LED at Vf3 which is a voltage higher than Vf2, such that the third LED begins to emit light. In addition, in a situation in which the input voltage is decreased over time, the third LED first stops the emitting of light at Vf3, the second LED stops the emitting of light at Vf2, and the first LED finally stops the emitting of light at Vf1, such that an LED driving current is designed so as to approximate the input voltage. In according to the sequential driving mode of the alternating current LED, since the LED driving current is converged in a form similar to the alternating current input voltage, the power factor may be improved. However, there are problems that the flicker phenomenon still occurs in the non-emitting interval in which the input voltage does not reach Vf1 and light characteristics of the lighting fixture are not uniform because emitting times for each light emitting module of the LED are different from each other.

Meanwhile, in order to solve the problems of the sequential driving mode of the alternating current LED, various technologies for removing the non-emitting interval using a smooth capacitor, a power factor correction circuit, and the like have been proposed (Korean Patent Laid-Open Publication No. 10-2010-0107196). However, according to the above-mentioned technologies, there is a problem that total harmonic distortion (THD) is rather deteriorated due to element characteristics in which the current is sharply increased at a timing in which the smooth capacitor begins to charge. In addition, there is a problem that high capacitance is required because the smooth capacitor should maintain a voltage of at least Vf3 or more in order to drive all LEDs in the non-emitting interval. In addition, due to the above-mentioned problems, there is a problem that cost of the smooth capacitor is increased and it is difficult to miniaturize the LED lighting fixture.

SUMMARY OF THE INVENTION

The present invention is to solve the problems of the related art as described above.

An object of the present invention is to provide an LED driving apparatus and driving method capable of effectively removing a flicker phenomenon by removing a non-emitting interval.

Another object of the present invention is to provide an LED driving apparatus and driving method capable of decreasing energy storage capacity of a required energy chargeable and dischargeable element or circuit, reducing manufacturing cost, and miniaturizing an LED lighting fixture, by not connecting the energy chargeable and dischargeable element (or circuit) for providing a second driving voltage to a total of LED groups but connecting the energy chargeable and dischargeable element (or circuit) to an intermediate node of the LED groups connected in series to each other.

Still another object of the present invention is to provide an LED driving apparatus and driving method capable of charging an energy chargeable and dischargeable element (or circuit) in a relatively long interval as compared to the related art in which a total of LED groups and a smooth capacitor are connected, by not connecting the energy chargeable and dischargeable element (or circuit) for providing a second driving voltage to the total of LED groups but connecting the energy chargeable and dischargeable element (or circuit) to an intermediate node of the LED groups connected in series to each other.

Finally, another object of the present invention is to prevent partial deterioration of LED groups by improving uniformity of an emitting time between a plurality of LED groups by turning-off LED groups of a front stage having a relatively long emitting interval and selectively driving LED groups of a rear stage having a relatively short emitting interval in a non-emitting interval.

A characteristic configuration of the present invention for accomplishing the objects of the present invention as described above and unique effects of the present invention to be described below will be described below.

According to an aspect of the present invention, there is provided a light emitting diode (LED) driving apparatus including: an LED driving module providing a first driving voltage having a voltage value changed over time, a minimum voltage value of at least Vf1 or less, and a maximum voltage value of at least Vfn or more; and an LED light emitting module configured to include a first LED group and a second LED group to an n-th LED group, and receiving the first driving voltage from the LED driving module (n is an integer of two or more), wherein the LED driving module drives the LED light emitting module so that the first LED group is turned-on when the first driving voltage is Vf1 or more, drives the LED light emitting module so that the first LED group and the second LED group are connected in series with each other and are turned-on when the first driving voltage is Vf2 or more, and drives the LED light emitting module so that the first LED group to the n-th LED group are connected in series with each other and are all turned-on when the first driving voltage is Vfn or more (Vf1<Vf2<Vfn), and the LED driving apparatus includes a second driving voltage providing module storing a portion of the first driving voltage and selectively providing a second driving voltage to the remaining LED groups except for at least the first LED group of the LED groups when the first driving voltage is at least Vf1 or less.

The first driving voltage may be a full-wave rectified alternating current voltage, the LED light emitting module may include a k-th node between a cathode terminal of a k-th LED group and an anode terminal of a k+1-th LED group (1≤k≤n−1), and the second driving voltage providing module may be configured to include an energy charging and discharging unit connected to the k-th node, so as to selectively provide the second driving voltage to the k+1-th LED group to the n-th LED group except for the first LED group to the k-th LED group of the LED groups when the first driving voltage is Vfk or less.

The LED light emitting providing module may further include a current blocking unit between the k-th node and the cathode terminal of the k-th LED group, the current blocking unit may block a current generated by the second driving voltage from being input to the k-th LED group.

The second driving voltage providing module may be connected to a first node of the LED light emitting module, so as to selectively provide the second driving voltage to the second LED group to the n-th LED group except for the first LED group of the LED groups when the first driving voltage is at least Vf1 or less.

When the second driving voltage providing module stores the portion of the first driving voltage, the second driving voltage providing module may further include an input current limiting unit uniformly limiting a current input to the second driving voltage providing module.

The second driving voltage providing module may further include a switch unit controlling an electrical connection between the energy charging and discharging unit and the k-th node, and the energy charging and discharging unit may enter a charging mode in which a charging is performed by the first driving voltage when the switch unit is in an off-state and enter a discharging mode in which a discharging is performed and the second driving voltage is provided to the LED light emitting module when the switch unit is in an on-state.

The switch unit may be switched into the on-state when no current flows through the LED light emitting module and may be switched into the off-state when the current flowing through the LED light emitting module reaches a set current value.

The switch unit may be switched into the off-state when a current flowing through any one of the first LED group to the k-th LED group to which the second driving voltage is not provided reaches the set current value.

The switch unit may be switched into the on-state when the first driving voltage is decreased to Vfk or less and may be switched into the off-state when the first driving voltage is increased to Vfk or more.

According to another aspect of the present invention, there is provided a driving method of a light emitting diode (LED) driving apparatus that sequentially drives an LED light emitting module including a first LED group and a second LED group to an n-th LED group, using a first driving voltage having a voltage value changed over time, the driving method including: (a) driving the LED light emitting module so that the first LED group is turned-on when the first driving voltage is Vf1 or more, driving the LED light emitting module so that the first LED group and the second LED group are connected in series with each other and are turned-on when the first driving voltage is Vf2 or more, and driving the LED light emitting module so that the first LED group to the n-th LED group are connected in series with each other and are all turned-on when the first driving voltage is Vfn or more (Vf1<Vf2<Vfn); (b) storing a portion of the first driving voltage in second driving voltage supplying module in an interval in which the first driving voltage is Vf1 or more; and (c) selectively providing a second driving voltage output from the second driving voltage providing module to the remaining LED groups except for at least the first LED group of the LED groups when the first driving voltage is at least Vf1 or less.

The first driving voltage may be a full-wave rectified alternating current voltage, the LED light emitting module may include a k-th node between a cathode terminal of a k-th LED group and an anode terminal of a k+1-th LED group (1≤k≤n−1), the second driving voltage providing module may be configured to include an energy charging and discharging unit connected to the k-th node, and in the step (c), when the first driving voltage is Vfk or less, the second driving voltage may be selectively provided to the k+1-th LED group to the n-th LED group except for the first LED group to the k-th LED group of the LED groups.

In the step (c), a current generated by the second driving voltage may be blocked from being input to the k-th LED group between the k-th node and the cathode terminal of the k-th LED group.

The second driving voltage module may be connected to a first node of the LED light emitting module, and in the step (c), when the first driving voltage is at least Vf1 or less, the second driving voltage may be selectively provided to the second LED group to the n-th LED group except for the first LED group of the LED groups.

In the step (b), when the portion of the first driving voltage is stored in the second driving voltage providing module, a current input to the second driving voltage providing module may be uniformly limited.

The second driving voltage providing module may further include a switch unit controlling an electrical connection between the energy charging and discharging unit and the k-th node, in the step (b), the switch unit may be switched into an off-state so as to charge the energy charging and discharging unit with the first driving voltage, and in the step (c), the switch unit may be switched into an on-state so as to provide the second driving voltage discharged from the energy charging and discharging unit to the LED light emitting module.

In the step (b), a current flowing through the LED light emitting module may be detected and when the detected current reaches a set current value, the switch unit may be switched into the off-state, and in the step (c), the current flowing through the LED light emitting module may be detected and when no current flows through the LED light emitting module, the switch unit may be switched into the on-state.

In the step (b), a current flowing through any one of the first LED group to the k-th LED group to which the second driving voltage is not provided may be detected, and when the detected current reaches the set current value, the switch unit may be switched into the off-state.

In the step (b), when the first driving voltage is increased to Vfk or more, the switch unit may be switched into the off-state, and in the step (c), when the first driving voltage is decreased to Vfk or less, the switch unit may be switched into the on-state.

According to an exemplary embodiment of the present invention, the flicker phenomenon may be removed by removing the non-emitting interval.

In addition, according to the present invention, since the energy chargeable and dischargeable element (or circuit) maintains the voltage or more corresponding to not Vfn but 'Vfn-Vfk' having smaller magnitude than Vfn in the non-emitting interval, by not connecting the energy chargeable and dischargeable element (or circuit) for providing the second driving voltage to the total of LED groups but connecting the energy chargeable and dischargeable element (or circuit) to the intermediate node of the LED groups connected in series to each other, the relatively low energy storage capacity is required, thereby making it possible to decrease an increase factor of the manufacturing cost due to the energy chargeable and dischargeable element (or circuit) and to miniaturize the LED lighting fixture.

In addition, according to the present invention, in the related art in which the total of LED groups and the smooth capacitor are connected, the energy chargeable and dischargeable element (or circuit) may be charged only in a relatively short interval of Vfn (a voltage at which the final LED group is turned-on) or more which is a relatively high voltage value, but according to the present invention in which the intermediate node of the LED groups and the energy chargeable and dischargeable element (or circuit) are connected, since the energy chargeable and dischargeable element (or circuit) may be charged in a relatively long interval of 'Vfn-Vfk' or more which is a relatively low voltage value, the energy chargeable and dischargeable element (or circuit) may charge more charges.

DETAILED DESCRIPTION OF THE ILLUSTRATED EMBODIMENTS

The present invention will be described below in detail with reference to the accompanying drawings showing specific exemplary embodiments in which the present invention may be practiced. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that positions or arrangements of individual components in each disclosed exemplary embodiment may be changed without departing from the spirit and the scope of the present invention. Therefore, a detailed description described below should not be construed as being restrictive and the scope of the present invention is defined only by the accompanying claims and their equivalents if appropriate. Similar reference numerals will be used to describe the same or similar functions throughout the accompanying drawings.

Hereinafter, exemplary embodiments of the present invention will be described in detail with reference to the accompanying drawings so that those skilled in the art may easily implement the present invention.

[Exemplary Embodiment of the Present Invention]

According to an exemplary embodiment of the present invention, a term "LED group" refers to a collection of LEDs in which a plurality of LEDs (or a plurality of light emitting cells) are connected in series with/in parallel to/in series with and in parallel to each other, so that an operation thereof is controlled (i.e., simultaneously turned-on/off) as a single unit according to a control of an LED driving module.

In addition, a term 'first forward voltage level Vf1' refers to a threshold voltage level capable of driving a first LED group, a term 'second forward voltage level Vf2' refers to a threshold voltage level capable of driving the first LED group and a second LED group which are connected in series with each other, and a term 'third forward voltage level Vf3' refers to a threshold voltage level capable of driving first to third LED groups which are connected in series with each other. That is, a term 'n-th forward voltage level Vfn' refers to a threshold voltage level capable of driving first to n-th LED groups which are connected in series with each other.

In addition, a term 'alternating current LED driving module' refers to a module receiving an alternating current voltage so as to drive and control an LED, and the present specification provides a description based on an exemplary embodiment controlling the driving of the LED using a rectified voltage, but the alternating current LED driving module is not limited thereto and should be interpreted in a comprehensive meaning and a broad sense meaning.

In addition, a term 'sequential driving mode' refers to a driving mode of sequentially emitting a plurality of LED groups according to an increase in an applied input voltage and sequentially turning-off the plurality of LED groups according to a decrease in the applied input voltage, in an LED driving module driving the LED by receiving an input voltage having magnitude which is varied over time.

In addition, a term 'first driving voltage' refers to an input voltage itself or a driving voltage which is primarily supplied to the LED groups by constantly processing the input voltage (e.g., the processing through a process such as a rectifying circuit).

In addition, a term 'second driving voltage' refers to a driving voltage which is secondarily supplied to the LED groups from an energy storage element after the input voltage is stored in the energy storage element. The above-mentioned second driving voltage may be the driving voltage which is supplied to the LED groups from a charged capacitor after the input voltage is stored in a capacitor.

In addition, a term 'emitting interval', which is an interval in which a first LED group is turned-on by the input voltage (first driving voltage), refers to an interval in which the input voltage is Vf1 or more, in the sequential driving mode.

In addition, a term 'non-emitting interval', which is an interval in which the input voltage (first driving voltage) does not turn-on any group of the LED groups, refers to an interval in which the input voltage is less than Vf1, in the sequential driving mode.

In addition, terms such as V1, V2, V3, . . . , t1, t2, . . . , T1, T2, T3, and the like used for expressing any certain voltages, certain timings, certain temperatures, and the like in the present specification are not used to express absolute values, but used to distinguish from each other.

Overview of LED Driving Apparatus

Figure 1:
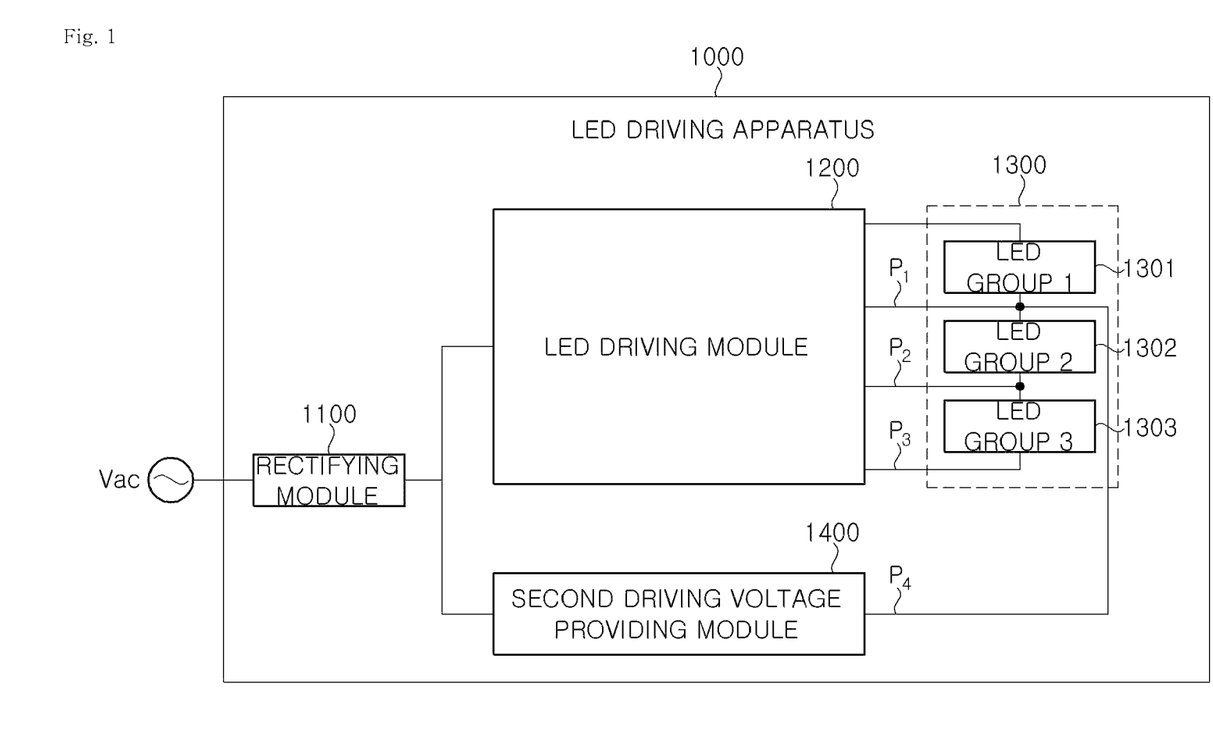
FIG. 1 is a schematic configuration block diagram of an LED driving apparatus according to an exemplary embodiment of the present invention.

FIG. 1 is a schematic configuration block diagram of an LED driving apparatus according to an exemplary embodiment of the present invention. Hereinafter, a configuration and a function of an LED driving apparatus 1000 according to the present invention will be schematically described with reference to FIG. 1.

First, the LED driving apparatus 1000 according to the present invention receives an alternating current voltage Vac from an alternating current voltage source and rectifies the received alternating current voltage so as to generate a rectified voltage Vrec. In addition, the LED driving apparatus 1000 is configured to control a driving of an LED light emitting module 1300 by providing a first driving voltage to the LED light emitting module 1300 using the generated rectified voltage Vrec. Hereinafter, for purpose of illustration and clear understanding, a description will be provided based on an exemplary embodiment in which the LED driving apparatus 1000 according to the present invention controls the driving of the LED light emitting module 1300 using the rectified voltage generated by rectifying the received alternating current voltage Vac. Therefore, in the exemplary embodiment described above, the first driving voltage is the rectified voltage Vrec. However, it should be noted that the LED driving apparatus 1000 according to the present invention is not limited to the case of using the rectified voltage Vrec, but the LED driving apparatus 1000 according to the present invention may be applied to various cases in which the sequential driving mode may be adopted, that is, the magnitude of the input voltage is changed over time. For example, the LED driving apparatus 1000 according to the present invention may also be used to drive an alternating current LED (e.g., the LED in which the LED groups are disposed to be connected in anti-parallel to each other) which may be directly applied with the alternating current voltage Vac and may be sequentially driven.

In addition, the LED driving apparatus 1000 according to the present invention is configured to simultaneously perform the functions of storing a portion of the first driving voltage during the emitting interval as described above and then supplying the stored energy to the LED light emitting module 1300 as the second driving voltage during the non-emitting interval, as described above. By the configuration mentioned above, the LED driving apparatus 1000 according to the present invention may solve a flicker phenomenon by removing the non-emitting interval of the LED light emitting module 1300.

In order to perform the function as described above, the LED driving apparatus 1000 may include a rectifying module 1100, an LED driving module 1200, a second driving voltage providing module 1400, and an LED light emitting module 1300, as shown in FIG. 1.

Figure 2:
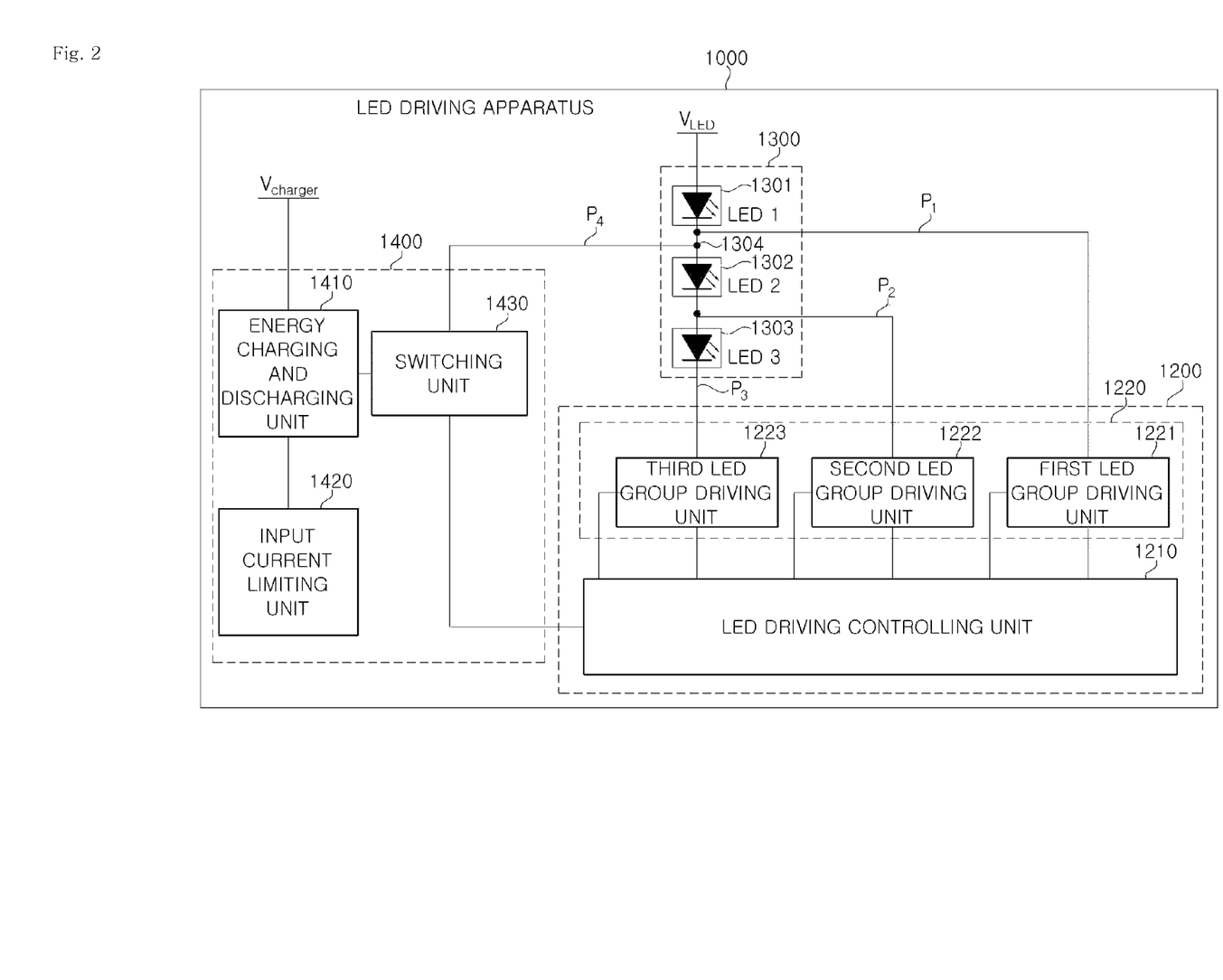
FIG. 2 is a detailed configuration block diagram of the LED driving apparatus according to an exemplary embodiment of the present invention.
Figure 3:
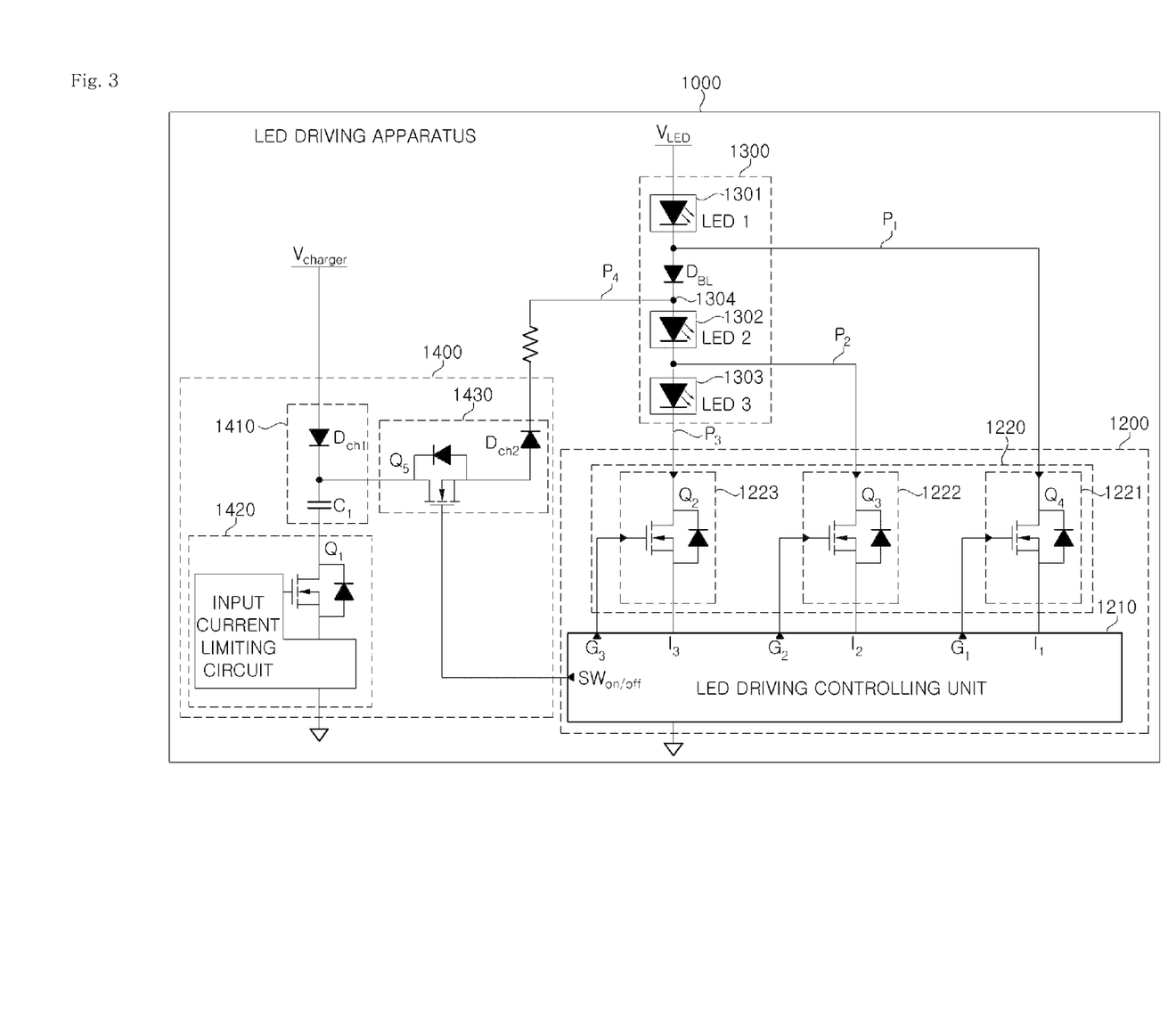
FIG. 3 is a circuit diagram of the LED driving apparatus according to an exemplary embodiment of the present invention.

First, the LED light emitting module 1300 may include a plurality of LED groups, and the plurality of LED groups included in the LED light emitting module 1300 are sequentially turned-on and sequentially turned-off according to the control of the LED driving module 1200. Although FIGS. 1 to 3 show the LED light emitting module 1300 including a first LED group 1301, a second LED group 1302, and a third LED group 1303, it is apparent to those skilled in the art that the number of LED groups included in the LED light emitting module 1300 may be variously changed, if necessary.

Meanwhile, depending on the configuration of the exemplary embodiment, the first LED group 1301, the second LED group 1302, and the third LED group 1303 may also have forward voltage levels different from each other. For example, when the first LED group 1301, the second LED group 1302, and the third LED group 1303 are configured to include the number of LED elements different from each other, the first LED group 1301, the second LED group 1302, and the third LED group 1303 have forward voltage levels different from each other.

The rectifying module 1100 according to the present invention is configured to rectify the alternating current voltage Vac received from an external voltage source, and generate and output the rectified voltage Vrec. As the rectifying module 1100 described above, one of various known rectifying circuits such as a full-wave rectifying circuit, a half-wave rectifying circuit, and the like may be used. The rectified voltage Vrec output from the rectifying module 1100 is output to the LED light emitting module 1300, the LED driving module 1200, and the second driving voltage providing module 1400.

The LED driving module 1200 according to the present invention determines magnitude of the input rectified voltage, and determines amplitude of an LED driving signal to be provided to the LED light emitting module 1300 (more particularly, each of the plurality of LED groups 1301 to 1303 included in the LED light emitting module 1300), and a providing timing and a blocking timing of the LED driving signal, depending on the determined magnitude of the rectified voltage. In addition, the LED driving module 1200 is configured to control the driving of the LED light emitting module 1300 by providing the LED driving signal having the determined amplitude to one or the plurality of LED groups (one or more of 1301 to 1303) at the determined providing timing of the LED driving signal and stopping the provision of the LED driving signal to one or the plurality of LED groups (one or more of 1301 to 1303) at the determined blocking timing of the LED driving signal. A detailed configuration and function of the LED driving module 1200 according to the present invention described above will be described below with reference to FIGS. 2 and 3.

In addition, the LED driving module 1200 according to the present invention may further perform a function of controlling an operation of the second driving voltage providing module 1400. That is, the LED driving module 1200 according to the present invention may be configured to determine a non-emitting interval by monitoring a voltage level of the rectified voltage Vrec or a current flowing in the LED group (any one of 1301 to 1303), allow the second driving voltage to be supplied to the LED light emitting module 1300 by controlling the second driving voltage providing module 1400 in the case in which it is determined that the non-emitting interval is started, and also stop the supply of the second driving voltage by controlling the second driving voltage providing module 1400 in the case in which it is determined that the non-emitting interval is terminated. A detailed content of a function of controlling an operation of the second driving voltage providing module 1400 of the LED driving module 1200 described above will be described below with reference to FIGS. 2 and 3.

The second driving voltage providing module 1400 according to the present invention is configured to be disposed between the rectifying module 1100 and the LED light emitting module 1300 and perform functions of receiving the rectified voltage (i.e., the first driving voltage) from the rectifying module 1100 so as to store energy and providing the stored energy to the LED light emitting module 1300 as the second driving voltage in the case in which a preset condition is satisfied or according to the control of the LED driving module 1200. A detailed configuration and function of the second driving voltage providing module 1400 according to the present invention described above will be described below with reference to FIGS. 2 and 3.

Configuration and Function of LED Driving Module

FIG. 2 is a detailed configuration block diagram of the LED driving apparatus according to an exemplary embodiment of the present invention and FIG. 3 is a circuit diagram of the LED driving apparatus according to an exemplary embodiment of the present invention. Hereinafter, a detailed configuration and function of the LED driving apparatus 1000 according to the present invention will be described with reference to FIGS. 2 and 3.

First, in FIGS. 2 and 3, the rectifying module 1100 of FIG. 1 is not shown. Main technical characteristics of the present invention are the second driving voltage providing module 1400 and a connection structure of the second driving voltage providing module 1400. Therefore, it should be noted that the rectifying module 1100 of FIG. 1 is not an essential component of the present invention and there is also no necessity for a driving voltage $V_{LED}$ supplied to the LED light emitting module 1300 and a charging voltage $V_{charger}$ supplied to charge the second driving voltage providing module 1400 be identical to each other. However, hereinafter, for convenience of explanation and clarity of understanding, the LED driving apparatus 1000 according to the present invention will be described based on an exemplary embodiment in which the rectified voltage Vrec output from the rectifying module 1100 is provided to the LED light emitting module 1300, the LED driving module 1200, and the second driving voltage providing module 1400 as the first driving voltage with reference to FIG. 1.

LED Driving Control Function

As shown in FIGS. 2 and 3, the LED driving module 1200 according to the present invention may include a plurality of LED group driving units 1220 and an LED driving controlling unit 1210, in order to drive and control the LED groups 1301 to 1303.

First, the LED driving controlling unit 1210 is configured to determine magnitude of the rectified voltage received from the rectifying module 1100, and determine amplitude of the LED driving signal to be provided to each of the LED groups 1301 to 1303, and the providing timing and blocking timing of the LED driving signal, depending on the magnitude of the rectified voltage. In addition, the LED driving controlling unit 1210 is configured to turn-on a corresponding LED group(s) by providing the LED driving signal to the corresponding LED group(s) by controlling the LED group driving units 1220 at the determined providing timing of the LED driving signal of each LED group and turn-off the corresponding LED group by blocking the provision of the LED driving signal to the corresponding LED group(s) by controlling the LED group driving units 1220 at the determined blocking timing of the LED driving signal of each LED group. In addition, unlike the LED driving controlling unit 1210 according to the related art that performs only the sequential driving function, the LED driving controlling unit 1210 according to the present invention is configured to be linked with the second driving voltage providing module 1400 and maintain a turned-on state of an appropriate LED group(s) by providing the LED driving signal to the corresponding LED group(s) even in the non-emitting interval (or a preset interval). A detailed description of the function described above will be described below with reference to FIG. 4.

The plurality of LED group driving units 1220 correspond to the plurality of LED groups 1301 to 1303 one-to-one, and perform a function providing the LED driving signal to each of the plurality of LED groups 1301 to 1303 or blocking the provision of the LED driving signal, depending on the control of the LED driving controlling unit 1210. More specifically, as shown in FIGS. 2 and 3, the first LED group driving unit 1221 is connected to the first LED group 1301, and is configured to provide the LED driving signal or block the provision of the LED driving signal to the first LED group 1301, depending on the control of the LED driving controlling unit 1210. Similarly, the second LED group driving unit 1222 is connected to the second LED group 1302 and the third LED group driving unit 1223 is connected to the third LED group 1303, and the second and third LED driving units 1222 and 1223 are configured to perform functions providing the LED driving signal and blocking the provision of the LED driving signal to the corresponding LED group.

The LED group driving unit 1220 as described above may be implemented using an electronic switching element such as a bipolar junction transistor (BJT), a field effect transistor (FET), or the like, and a kind thereof is not limited. In the case in which the LED group driving unit 1220 is implemented using the electronic switching element, the LED driving controlling unit 1210 controls the provision and the blocking of the LED driving signal to a specific LED group by controlling a turn-on and a turn-off of each of the LED group driving units 1220 using a control signal of a pulse type. FIG. 3 shows an exemplary embodiment in which the LED group driving unit 1220 according to the present invention is implemented by an N-channel enhancement-mode MOSFET (E-MOSFET). Therefore, in the exemplary embodiment shown in FIG. 3, when Vgs is zero, the LED group driving unit 1220 is turned-off.

LED Driving Control in Emitting Interval

Figure 4:
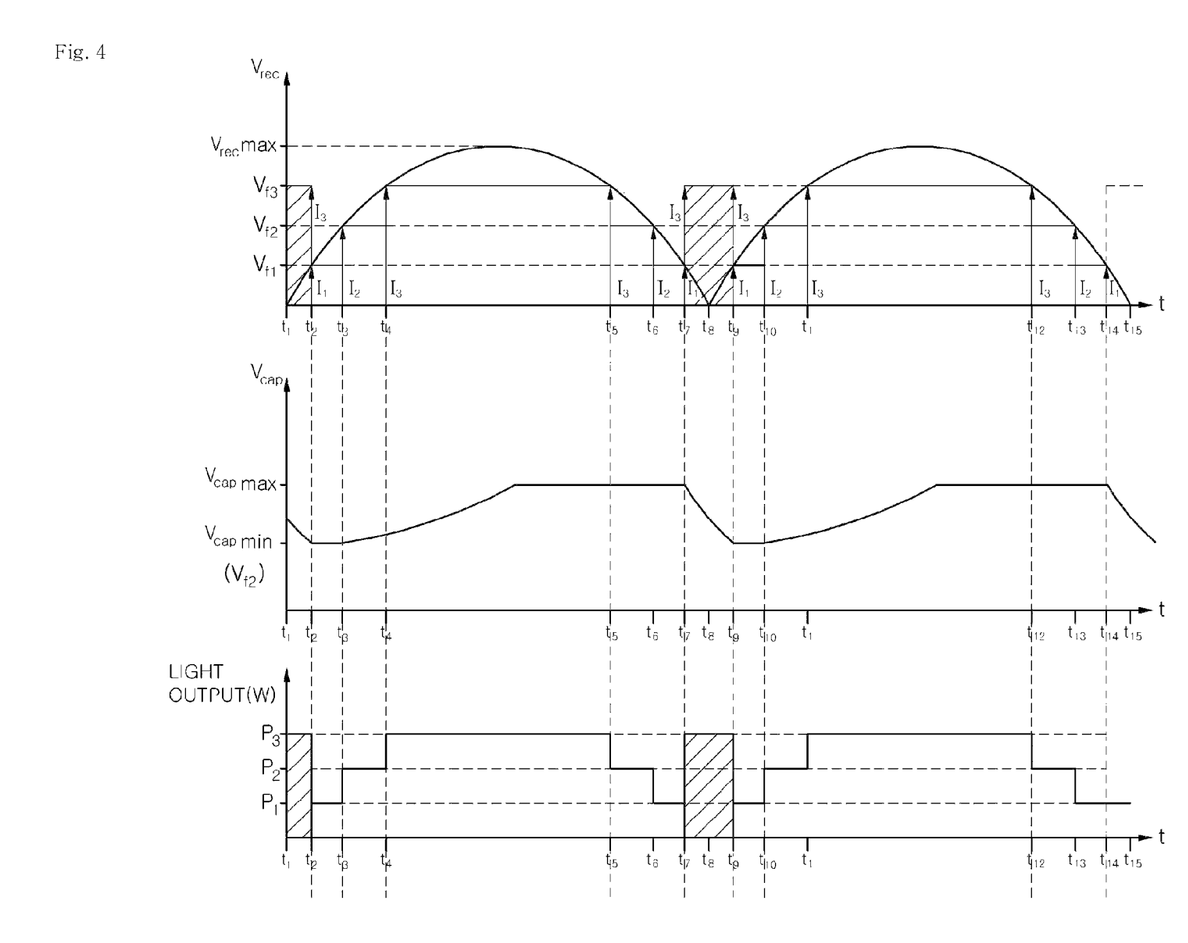
FIG. 4 is a waveform diagram showing a rectified voltage, an LED driving current, a capacitor voltage, and a light output waveform of a light emitting module within the LED driving apparatus according to an exemplary embodiment of the present invention.

First, as shown in FIG. 4, the rectified voltage Vrec is changed between zero and Vrec max with the lapse of time. Therefore, the LED driving controlling unit 1210 according to the present invention determines magnitude of the rectified voltage Vrec and controls the plurality of LED group driving units 1220 so that the LED driving signal may be provided to only the first LED group 1301 of three LED groups 1301 to 1303 in the case in which the magnitude of the received rectified voltage Vrec is magnitude capable of driving only the first LED group 1301 (i.e., in the case in which a voltage level of the rectified voltage Vrec belongs to a first forward voltage level (Vf1≤Vrec<Vf2)). Similarly, the LED driving controlling unit 1210 controls the plurality of LED group driving units 1220 so that the first LED group 1301 and the second LED group 1302 are connected in series with each other and the LED driving signal may be provided to the first LED group 1301 and the second LED group 1302 connected in series with each other in the case in which the voltage level of the rectified voltage Vrec belongs to a second forward voltage level (Vf2≤Vrec<Vf3). In addition, the LED driving controlling unit 1210 controls the plurality of LED group driving units 1220 so that the first LED group 1301, the second LED group 1302, and the third LED group 1303 are connected in series with each other and the LED driving signal may be provided to all of the first LED group 1301, the second LED group 1302, and the third LED group 1303, in the case in which the voltage level of the rectified voltage Vrec belongs to a third forward voltage level (Vf3≤Vrec<Vrec max).

LED Driving Control in Non-Emitting Interval

In addition, the LED driving controlling unit 1210 according to the present invention allows the second driving voltage to be supplied to the LED light emitting module 1300 from the second driving voltage providing module 1400 during the non-emitting interval and is configured to be able to block the provision of the second driving voltage from the second driving voltage providing module 1400 in the case in which the non-emitting interval is terminated.

The LED driving controlling unit 1210 may be generally configured to determine whether or not the non-emitting interval is started (i.e., a timing providing the second driving voltage) and whether or not the non-emitting interval is terminated (i.e., a timing blocking the second driving voltage) using one of two modes.

1) Determine and Control of Non-Emitting Interval based on Voltage Level of First Driving Voltage First, the LED driving controlling unit 1210 according to an exemplary embodiment of the present invention may be configured to determine whether or not the non-emitting interval is started and is terminated by determining the voltage level of the rectified voltage Vrec. As described above, since the 'non-emitting interval' refers to the interval in which any LED group of the plurality of LED groups included in the LED light emitting module 1300 is not turned-on in the present specification, the LED driving controlling unit 1210 may be configured to determine a timing at which the voltage level of the rectified voltage Vrec drops below Vf1 as a non-emitting interval start timing and determine a timing at which the voltage level of the rectified voltage Vrec rises over Vf1 as a non-emitting interval termination timing. In the case in which the exemplary embodiment is implemented in the mode described above, the LED driving controlling unit 1210 according to the present invention determines the voltage level of the rectified voltage Vrec and determines that the non-emitting interval is started when the voltage level of the rectified voltage Vrec reaches Vf1 while being decreased over time, thereby performing a control so that the second driving voltage may be supplied to the LED light emitting module 1300 from the second driving voltage providing module 1400. In addition, the LED driving controlling unit 1210 determines that the non-emitting interval is terminated when the voltage level of the rectified voltage Vrec reaches Vf1 while being increased over time, after the non-emitting interval is started, thereby performing a control so that the supply of the second driving voltage from the second driving voltage providing module 1400 may be blocked.

Meanwhile, the LED group(s) supplied with the second driving voltage supplied from the second driving voltage providing module 1400 is determined depending on a node in the LED light emitting module 1300 to which the second driving voltage providing module 1400 is connected. In the present invention, the 'node', which is one point of a wiring connecting a cathode terminal of a specific LED group (e.g., k-th LED group) to an anode terminal of another specific LED group (e.g., k+1-th LED group) disposed next to the specific LED group, refers to a point to which the second driving voltage providing module 1400 may be connected. Therefore, a first node is present between the first LED group 1301 and the second LED group 1302, and a second node is present between the second LED group 1302 and the third LED group 1303. In a similar way, a k-th node is present between a k-th LED group and a k+1-th LED group (1≤k≤n−1). It is assumed that first to n-th LED groups are included and the second driving voltage providing module 1400 is connected to the k-th node. In this case, since the second driving voltage supplied from the second driving voltage providing module 1400 is applied to an anode terminal of the k+1-th LED group through the k-th node, the first LED group to the k-th LED group are not supplied with the second driving voltage and are not turned-on, and the k+1-th LED group to the n-th LED group are supplied with the second driving voltage and are turned-on. In the exemplary embodiment shown in FIGS. 2 and 3, the second driving voltage providing module 1400 is connected to the first node 1304 between the first LED group 1301 and the second LED group 1302. Therefore, in this case, in the non-emitting interval, the first LED group 1301 is not turned-on, and the second LED group 1302 and the third LED group 1303 are connected in series with each other and are supplied with the second driving voltage so as to be turned-on. Meanwhile, in the case in which the second driving voltage is supplied to the LED light emitting module 1300, the LED driving controlling unit 1210 according to the present invention is configured to control the LED group driving units so that the series connection between the LED groups to which the second driving voltage is provided is maintained. That is, in the exemplary embodiment shown in FIGS. 2 and 3, the LED driving controlling unit 1210 controls the first to third LED group driving units 1220 so that a current path connecting the second driving voltage providing module 1400 to the second LED group 1302 and the third LED group 1303 may be formed. A more detailed description thereof will be provided below with reference to FIG. 4.

Meanwhile, as described above, since the second driving voltage providing module 1400 according to the present invention is connected to the specific node (e.g., the k-th node) in the LED driving module 1200, the LED driving module 1200 according to the present invention may further include a countercurrent prevention diode for preventing an LED driving current generated due to the application of the second driving voltage from being introduced into the k-th LED group. Briefly, referring to FIG. 3, in the exemplary embodiment shown in FIG. 3, since the second driving voltage providing module 1400 is configured to be connected to the first node 1304 in the LED driving module 1200, it may be seen that the countercurrent prevention diode DBL is provided between a cathode terminal of the first LED group and the first node.

2) Determine and Control of Non-Emitting Interval Based on LED Current

Meanwhile, the LED driving controlling unit 1210 according to another exemplary embodiment of the present invention may be configured to determine whether or not the non-emitting interval is started and is terminated by determining a value of an LED current flowing in any one LED group of the LED groups. That is, since the LED group (any one of 1301 to 1303) also has characteristics of a diode, the LED driving controlling unit 1210 may also be configured to determine that the non-emitting interval is started when the LED current flowing in the LED group(s) becomes zero or the LED current is gradually decreased and reaches a set current value which is preset, using the above-mentioned element characteristics. In addition, in a similar way, the LED driving controlling unit 1210 according to the present invention may also be configured to determine that the non-emitting interval is terminated, in the case in which the LED current flowing through one of the LED group(s) to which the second driving voltage is not provided reaches the preset current value. Since the functions of the LED driving controlling unit 1210 depending on the start and the termination of the non-emitting interval are similar to those described above, an additional description will be omitted.

Meanwhile, hereinabove, the exemplary embodiments configured so that the second driving voltage from the second driving voltage providing module 1400 is supplied or blocked based on whether or not the 'non-emitting interval' is started or terminated have been described. However, the LED driving apparatus according to the present invention is not limited thereto, and may be configured to control whether or not the second driving voltage is supplied or blocked, based on various references. For example, the condition supplying or blocking the second driving voltage may also be set to Vf2 capable of simultaneously driving the first LED group 1301 and the second LED group 1302 connected in series with each other. In this case, the LED driving controlling unit 1210 may allow the second driving voltage to be supplied to the third LED group 1303 when the voltage level of the rectified voltage Vrec drops below Vf2, and block the supply of the second driving voltage to the third LED group 1303 when the voltage level of the rectified voltage Vrec rises over Vf2. Of course, even in this case, the LED driving controlling unit 1210 may also be configured to determine whether or not the second driving voltage is supplied or blocked, based on the LED current value as described above.

Configuration and Function of Second Driving Voltage Providing Module

Hereinafter, a configuration and function of a second driving voltage providing module 1400 according to the present invention will be described with reference to FIGS. 2 and 3. As shown in FIGS. 2 and 3, the second driving voltage providing module 1400 according to the present invention may include an energy charging and discharging unit 1410 and a switch unit 1430.

The energy charging and discharging unit 1410 is configured to be applied with the first driving voltage (i.e., the rectified voltage Vrec in the present exemplary embodiment) so as to store a portion of the applied first driving voltage in a charging mode and provide the second driving voltage to the LED driving module 1200 through the switch unit 1430 in a discharging mode. In the exemplary embodiment shown in FIG. 3, the energy charging and discharging unit 1410 according to the present invention is implemented as a capacitor C1. However, the energy charging and discharging unit 1410 according to the present invention is not limited to the capacitor, and various elements or circuits having an energy charging and discharging function may be used as the energy charging and discharging unit 1410 according to the present invention. For example, a valley-fill circuit among various power factor correction circuits may be used as the energy charging and discharging unit 1410 according to the present invention. In addition, the energy charging and discharging unit 1410 according to the present invention may further include a countercurrent prevention diode Dch1 for preventing a current introduction into a power source terminal at the time of an energy discharging. Hereinafter, a description will be provided based on the energy charging and discharging unit 1410 implemented using the capacitor C1 for convenience of explanation.

Meanwhile, capacitance of the capacitor C1 may be determined depending on a kind of LED groups and the number of LED groups which is intended to be driven using the second driving voltage. In the exemplary embodiment shown in FIGS. 2 and 3, since the capacitor C1 supplies the second driving voltage to the second LED group 1302 and the third LED group 1303 in the non-emitting interval, the capacitance of the capacitor C1 needs to be determined so that a minimum value of a voltage of the capacitor C1 during an operation becomes Vf2. Therefore, in this case, the capacitor C1 is charged in an interval in which the voltage level of the first driving voltage is Vf2 or more, and the capacitor C1 is discharged in an interval in which the voltage level of the first driving voltage is less than Vf2. In the same principle, in the exemplary embodiment including the first LED group to the n-th LED group and having the capacitor configured to be connected to the k-th node, the capacitance of the capacitor needs to be determined so that a minimum voltage value of the capacitor may become Vfn-Vfk. In this case, the capacitor C1 is charged in an interval in which the voltage level of the first driving voltage is Vfn-Vfk or more, and the capacitor C1 is discharged in an interval in which the voltage level of the first driving voltage is less than Vfn-Vfk.

The switch unit 1430 is configured to be disposed between the energy charging and discharging unit 1410 and the LED light emitting module 1300 so as to perform turn-on/off an electrical connection between the energy charging and discharging unit 1410 and the LED light emitting module 1300, depending on the control of the LED driving controlling unit 1210. When the switch unit 1430 is turned-on, the energy charging and discharging unit 1410 enters a discharging mode so as to provide the second driving voltage to the LED light emitting module 1300, and when the switch unit 1430 is turned-off, the energy charging and discharging unit 1410 enters a charging mode so as not to provide the second driving voltage to the LED light emitting module 1300. The switch unit 1430 described above may be implemented using the electronic switching element such as the bipolar junction transistor (BJT), a field effect transistor (FET), or the like as described above. As shown in FIG. 3, the switch unit 1430 according to the present invention may include an electronic switching element Q5 which is selectively turned-on and turned-off depending on the control signal output from the LED driving controlling unit 1210, and a countercurrent prevention diode Dch2. FIG. 3 shows an exemplary embodiment in which the switching element Q5 is implemented by an N-channel enhancement-mode MOSFET (E-MOSFET).

Meanwhile, in the exemplary embodiment shown in FIGS. 2 and 3, the switch unit 1430 according to the present invention is connected to the first node 1304 between a cathode terminal of the first LED group 1301 and an anode terminal of the second LED group 1302. As described above, whether the switch unit 1430 according to the present invention is connected to any node may be variously changed depending on the configuration of the exemplary embodiment. That is, in the exemplary embodiment configured to include the first to n-th LED groups, it is noted that the switch unit 1430 may be connected to any one node of the first to k-th nodes, depending on an object thereof (whether or not the second driving voltage is provided to any LED group(s)).

In addition, more preferably, the second driving voltage providing module 1400 according to the present invention may further include an input current limiting unit 1420 for uniformly maintaining a charging current input to the capacitor C1 at a preset value. In general, since a transient current is input to the capacitor C1 due to element characteristics of the capacitor at a timing of a charging start of the capacitor C1, damage to the capacitor C1 and an occurrence of radio frequency noise may be problems. Therefore, in order to solve the problems described above, the second driving voltage proving module 1400 according to the present invention may be configured to include the input current limiting unit 1420.

The input current limiting unit 1420 is a kind of constant current controlling circuit. As shown in FIG. 3, the input current limiting unit 1420 according to the present invention may be configured to include a switching element Q1 performing a current controlling function and a current limiting circuit capable of maintaining a current flowing in the capacitor C1 at a constant current by measuring a value of the current flowing in the capacitor C1 and controlling the switching element Q1 depending on the measured current value. Since the constant current controlling function itself is already known, a detailed description thereof will be omitted.

Example of LED Driving Control of LED Driving Apparatus

FIG. 4 is a waveform diagram showing a rectified voltage, an LED driving current, a capacitor voltage, and a light output waveform of a light emitting module within the LED driving apparatus according to an exemplary embodiment of the present invention. It is noted that FIG. 4 shows a state after an initial state, that is, a state after an initial charging of the capacitor C1 is completed. The LED driving signal according to the rectified voltage and the voltage level of the rectified voltage is shown at the uppermost portion of FIG. 4. In addition, the voltage waveform of the capacitor C1 used as the energy charging and discharging unit 1410 in the second driving voltage providing module 1400 according to the present invention is shown at a middle portion of FIG. 4. In addition, a light output waveform of the LED light emitting module 1300 according to the present invention is shown at the lowest portion of FIG. 4.

Hereinafter, an operation of the LED driving apparatus 1000 according to the present invention configured as described above will be described in detail with reference to FIGS. 2 to 4. Here, a description will be provided based on an exemplary embodiment in which the LED driving controlling unit 1210 according to the present invention is configured to determine that the non-emitting interval is started when the current flowing in the first LED group 1301 drops below the set current value (e.g., 90% of a driving current I1 of the first LED group 1301) which is preset, and determine that the non-emitting interval is terminated when the current flowing in the first LED group 1301 to which the second driving voltage is not supplied in the non-emitting interval rises over the set current value (e.g., 90% of the driving current I1 of the first LED group 1301) which is preset. In addition, in the exemplary embodiment described above, the capacitor C1 is configured to have the minimum voltage value of Vf2.

First, the following Table 1 illustrates operation states of the LED groups 1300 and the switch unit 1430 during one period (a half period of the alternating current voltage Vac) of the rectified voltage Vrec, in the exemplary embodiment configured so that the first LED group 1301 to the third LED group 1303 are sequentially turned-on as the voltage level of the rectified voltage Vrec is increased, the third LED group 1303 to the first LED group 1301 are sequentially turned-off as the voltage level of the rectified Vrec is decreased, and the second driving voltage is supplied to the second LED group 1302 and the third LED group 1303 in the non-emitting interval.

TABLE 1

| Vrec | First LED Group | Second LED Group | Third LED Group | Switch Unit |
|---|---|---|---|---|
| Vrec < Vf1 | OFF | ON | ON | ON |
| Vf1 ≤ Vrec < Vf2 | ON | OFF | OFF | OFF |
| Vf2 ≤ Vrec < Vf3 | ON | ON | OFF | OFF |
| Vf3 ≤ Vrec ≤ Vrec max | ON | ON | ON | OFF |
| Vf2 ≤ Vrec < Vf3 | ON | ON | OFF | OFF |
| Vf1 ≤ Vrec < Vf2 | ON | OFF | OFF | OFF |
| Vrec < Vf1 | OFF | ON | ON | ON |

According to an exemplary embodiment of the present invention, the LED group driving units 1220 may be configured to be each operated as a constant current source.

As illustrated in Table 1, first, from a timing t1 at which a period starts to a timing t2 at which the rectified voltage Vrec rises over the first forward voltage level Vf1, which is a non-emitting mode, the second driving voltage output from the capacitor C1 is supplied to the second LED group 1302 and the third LED group 1303, so that the second LED group 1302 and the third LED group 1303 are turned-on. In this case, since a current path P4 from the capacitor C1 to the first node 1304 needs to be formed, the switch unit 1430 is in a turned-on state, and in addition, since a current path P3 from the first node 1304 to the LED driving controlling unit 1210 through the second LED group and the third LED group needs to be formed, the second LED group driving unit 1222 is in a turned-off state and the third LED group driving unit 1223 is in the turned-on state. Here, since the third LED group driving unit 1223 is the turned-on state, an LED driving current controlled by the third LED group driving unit 1223 is I3. In addition, it may be seen from a change in a voltage of the capacitor C1 within the interval t1 to t2 described above that the voltage of the capacitor C1 is decreased over time as the second driving voltage is supplied. Meanwhile, what the first LED group driving unit 1221 maintains the turned-on state in the interval t1 to t2 is to determine whether or not the non-emitting interval is terminated by determining whether or not the current flowing in the first LED group 1301 is the set current value or more.

With the lapse of time, when the current flowing in the first LED group 1301 is the set current value or more as magnitude of the rectified voltage Vrec is gradually increased, the LED driving controlling unit 1210 determines that the non-emitting interval is terminated and the emitting interval is started. Therefore, at a timing (approximately, in the vicinity of t2) in which the current flowing in the first LED group 1301 becomes 90% of the first LED driving current I1, the LED driving controlling unit 1210 turns-off the switch unit 1430 and the third LED group driving unit 1223 and begins to apply the first driving control signal (e.g., 1V) to the first LED group driving unit 1221 by determining that the emitting interval is started. As the first LED group driving unit 1221 is driven, a preset constant current I1 (e.g., 50 mA) flows through the path P1, thereby turning-on the first LED group 1301. At a timing t3 in which the magnitude of the rectified voltage Vrec becomes the second forward voltage level Vf2 as the magnitude of the rectified voltage Vrec is continuously increased, the LED driving controlling unit 1210 turns-off the first LED group driving unit 1221 and begins to apply the second driving control signal (e.g., 2V) to the second LED group driving unit 1222. As the second LED group driving unit 1222 is driven, a preset constant current I2 (e.g., 70 mA) flows through the path P2, thereby turning-on the first LED group 1301 and the second LED group 1302. Similarly, at a timing t4 in which the magnitude of the rectified voltage Vrec becomes the third forward voltage level Vf3 as the magnitude of the rectified voltage Vrec is continuously increased, the LED driving controlling unit 1210 turns-off the second LED group driving unit 1222 and begins to apply the third driving control signal (e.g., 3V) to the third LED group driving unit 1223. As the third LED group driving unit 1223 is driven, a preset constant current I1 (e.g., 110 mA) flows through the path P3, thereby turning-on the first LED group 1301, the second LED group 1302, and the third LED group 1303.

A control in the case in which the rectified voltage Vrec reaches a maximum voltage and is then decreased over time is also performed in a way similar to that described above. With the lapse of time, at a timing t5 in which the magnitude of the rectified voltage Vrec is less than the third forward voltage level Vf3 as the magnitude of the rectified voltage Vrec is decreased, the LED driving controlling unit 1210 turns-off the third LED group driving unit 1223 and begins to apply the second driving control signal to the second LED group driving unit 1222. As the third LED group driving unit 1223 is turned-off and the second LED group driving unit 1222 is driven, a preset constant current I2 flows through the path P2, thereby turning-on the first LED group 1301 and the second LED group 1302. Similarly, at a timing t6 in which the magnitude of the rectified voltage Vrec is less than the second forward voltage level Vf2, the LED driving controlling unit 1210 turns-off the second LED group driving unit 1222 and begins to apply the first driving control signal to the first LED group driving unit 1221. As the second LED group driving unit 1222 is turned-off and the first LED group driving unit 1221 is driven, a preset constant current I1 flows through the path P1, thereby turning-on only the first LED group 1301.

In addition, when the magnitude of the rectified voltage Vrec is the first forward voltage level Vf1 or less, amplitude of the current flowing in the first LED group 1301 is gradually decreased, and accordingly, at a timing (approximately, in the vicinity of t7) in which the current flowing in the first LED group 1301 becomes the set current value (90% of I1) or less, the LED driving controlling unit 1210 determines that the non-emitting interval is started. Therefore, the LED driving controlling unit 1210 turns-on the switch unit 1430 by outputting a turn-on control signal to the switch unit 1430 and begins to apply the third driving control signal to the third LED group driving unit 1223 at the same time. As a result, since the current path P4 from the capacitor C1 to the first node 1304 is formed and the current path P3 from the first node 1304 to the LED driving controlling unit 1210 through the second LED group 1302 and the third LED group 1303 is also formed, the second LED group 1302 and the third LED group 1303 are turned-on.

Hereinabove, although the description has been made based on the exemplary embodiment in which it is determined whether or not the non-emitting interval is started or terminated by comparing the current flowing in the first LED group 1301 with the set current value, whether or not the non-emitting interval is started or terminated may also be determined based on whether or not the current flowing in the first LED group 1301 is zero in another exemplary embodiment. In addition, although the description has been made based on the exemplary embodiment in which the value of the constant current flowing in the LED groups 1301 to 1303 is changed depending on the voltage level of the rectified voltage Vrec, the value of the constant current flowing in the LED groups 1301 to 1303 may also be always constantly maintained regardless of the voltage level of the rectified voltage Vrec according to another exemplary embodiment.

Meanwhile, referring to a change in the voltage of the capacitor C1 in an interval t2 to t8, the capacitor C1 begins to be charged from the timing t3 in which the magnitude of the rectified voltage Vrec becomes the second forward voltage level Vf2. The reason is that the charging current is not input to the capacitor C1 due to a potential difference in an interval in which the magnitude of the rectified voltage Vrec is the second forward voltage level Vf2 or less, because the capacitor C1 is designed to always maintain a voltage of Vf2 or more during the operation of the LED driving apparatus 1000, as described above. In addition, when a charged voltage of the capacitor C1 reaches a maximum voltage Vcap max by performing the charging, the charging is completed. In addition, with the laps of time, since the capacitor C1 begins to be discharged according to the control of the LED driving controlling unit 1210, at a timing t7 in which the magnitude of the rectified voltage Vrec drops below the first forward voltage, the voltage of the capacitor C1 continuously drops during an interval t7 to t9.

In addition, it may be seen from the light output waveform of the LED light emitting module 1300 shown at the lowest portion of FIG. 4 that the light output of the LED light emitting module 1300 is compensated by the capacitor C1 in intervals (i.e., a time interval t1 to t2 and a time interval t7 to t9) indicated by oblique lines.

Meanwhile, according to another exemplary embodiment of the present invention, the LED group driving units 1220 may also be configured to simply perform only a switching operation. In the exemplary embodiment mentioned above, the LED driving controlling unit 1210 is configured to control the driving of the LED groups 1301 to 1303 by controlling the turn-on and the turn-off of the LED group driving units 1220 and the switch unit 1430 depending on the magnitude of the rectified voltage Vrec so as to form one of the current paths P1 to P4, in a way similar to that of the exemplary embodiment described above. Of course, in the exemplary embodiment described above, the current flowing in the LED groups 1301 to 1303 may maintain the preset value by connecting a constant current controlling unit (not shown) between the current paths and a ground.

Hereinabove, although the exemplary embodiment controlling the driving of the plurality of LED groups 1301 to 1303 depending on the magnitude of the rectified voltage Vrec based on the constant current controlling mode has been described, the present invention is not limited thereto, and various known LED driving controlling modes such as a constant voltage controlling mode, a constant power controlling mode, and the like may be used in the present invention.

Example of Driving Process of LED Driving Apparatus

Figure 5:
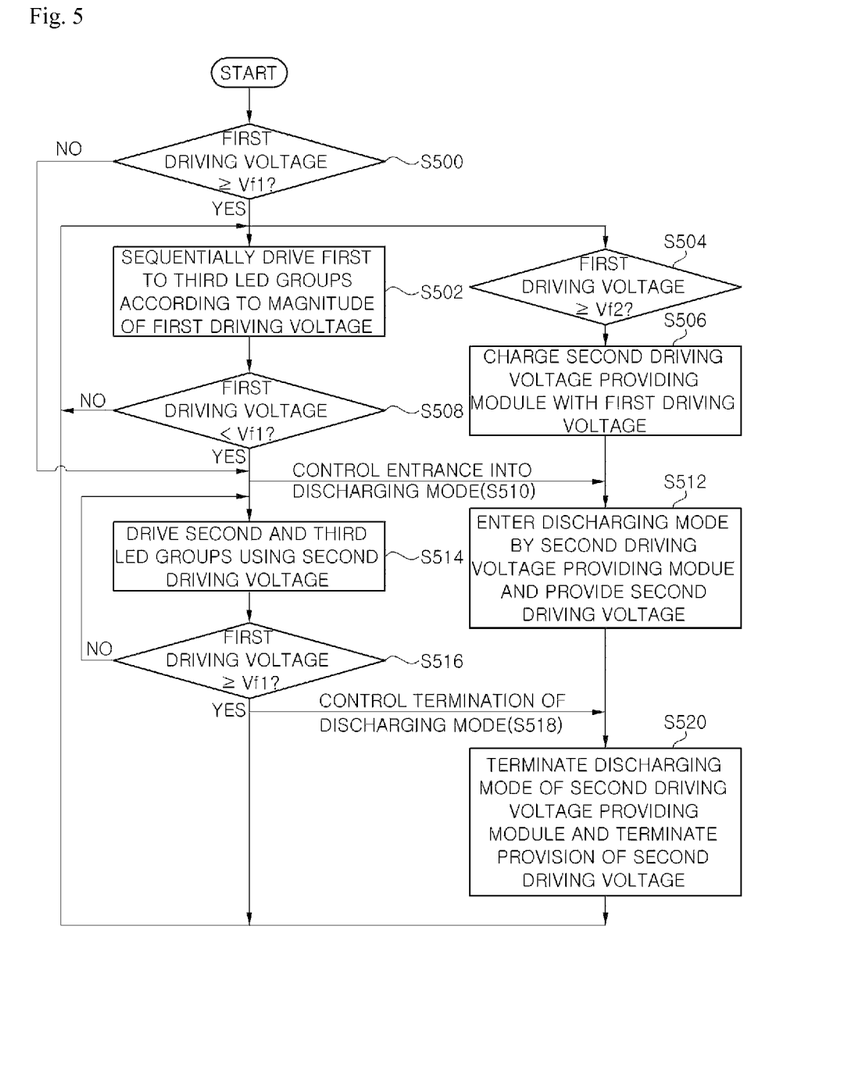
FIG. 5 is a flowchart showing driving processes of the LED driving apparatus according to an exemplary embodiment of the present invention.

FIG. 5 is a flowchart showing driving processes of the LED driving apparatus according to an exemplary embodiment of the present invention. Hereinafter, the driving processes of the LED light emitting module using the LED driving apparatus according to the present invention configured as described above will be described in detail.

Meanwhile, the exemplary embodiment described with reference to FIG. 5 is based on the exemplary embodiment configured to include the first LED group 1301, the second LED group 1302, and the third LED group 1303, and include the first LED group driving unit 1221, the second LED group driving unit 1222, and the third LED group driving unit 1223 that control the driving of each of the LED groups, as described above with reference to FIGS. 2 and 3. In addition, the exemplary embodiment described with reference to FIG. 5 is based on the exemplary embodiment configured to determine whether or not the emitting interval or the non-emitting interval is started and terminated, based on the voltage level of the first driving voltage (i.e., the rectified voltage Vrec).

First, the LED driving module 1200 determines magnitude of the first driving voltage (S500). As described above, when the magnitude of the first driving voltage is over the voltage level capable of turning-on at least one LED group of the plurality of LED groups 1301 to 1303 included in the LED light emitting module 1300 (i.e., the first driving voltage≥Vf1), the LED driving module 1200 determines that the emitting interval is started, and controls a sequential turn-on of the first LED group 1301 to the third LED group 1303 depending on the magnitude of the first driving voltage changed over time (S502). Since the sequential driving of the first LED group 1301 to the third LED group 1303 depending on the magnitude of the first driving voltage is the same as that described above, a detailed description thereof will be omitted. On the other hand, when it is determined that the magnitude of the first driving voltage is less than Vf1, the LED driving module 1200 determines that the non-emitting interval is started or in progress, and proceeds to S514 to drive the LED group(s) using the second driving voltage.

Meanwhile, in the case of the emitting interval, that is, in the case in which the first driving voltage is Vf1 or more (the first driving voltage≥Vf1), the second driving voltage providing module determines whether or not the first driving voltage is increased to Vf2 or more (S504), and charges the second driving voltage providing module using the first driving voltage in the case in which the first driving voltage is increased to Vf2 or more (S506). As described above, S504 and S506 described above are not actively controlled, but are passively and naturally performed depending on the design of the second driving voltage providing module 1400. That is, in the case in which a minimum voltage value of the second driving voltage providing module 1400 is designed to have Vf2, the charging current is input to the second driving voltage providing module 1400 due to the potential difference as the first driving voltage is increased to Vf2 or more, such that the second driving voltage providing module 1400 is charged. Therefore, it is apparent to those skilled in the art that the timing at which the charging occurs may be variously changed depending on the design of the second driving voltage providing module 1400.

Steps S502, S504, and S506 described above are independently performed in the LED driving module 1200 and the second driving voltage providing module 1400, respectively.

Meanwhile, the LED driving module 1200 controls the sequential driving of the first LED group 1301 to the third LED group 1303 using the first driving voltage in the emitting interval and determines whether the first driving voltage drops below Vf1 at the same time (S508).

When the first driving voltage drops below Vf1, the LED driving module 1200 determines that the non-emitting interval is started, and controls the second driving voltage providing module 1400 so as to enter a discharging mode in order to provide the second driving voltage to the LED light emitting module 1300 from the second driving voltage providing module 1400 (S510). As described above, the entrance of the second driving voltage providing module 1400 into the discharging mode may be performed by turning-on the switching element disposed between the second driving voltage providing module 1400 and the LED light emitting module 1300.

The second driving voltage providing module 1400 enters the discharging mode according to the control of the LED driving module 1200, and accordingly, the second driving voltage output from the second driving voltage providing module 1400 is provided to the second LED group 1302 and the third LED group 1303 (S512). As the same time, the LED driving module 1200 may perform a control so that the second LED group 1302 and the third LED group 1303 may be turned-on using the second driving voltage provided from the second driving voltage providing module 1400 by forming a current path connecting the second driving voltage providing module 1400, the second LED group 1302, the third LED group 1303, and the LED driving module 1200 (S514).

In addition, the LED driving module 1200 determines whether or not the first driving voltage is increased to Vf1 or more during the control of the turn-on of the second LED group 1302 and the third LED group 1303 using the second driving voltage provided from the second driving voltage providing module 1400 (S516).

When the first driving voltage is increased to Vf1 or more, the LED driving module 1200 determines that the non-emitting interval is terminated and the emitting interval is started, performs a control so that the second driving voltage providing module 1400 enters the charging mode, and returns to S502 (S518). As described above, the entrance of the second driving voltage providing module 1400 into the charging mode may be performed by turning-off the switching element disposed between the second driving voltage providing module 1400 and the LED light emitting module 1300. According to the control of the LED driving module 1200, the second driving voltage providing module 1400 enters the charging mode, terminates the provision of the second driving voltage, and returns to S504 (S520).

The invention claimed is:

1. A light emitting diode (LED) driving apparatus, comprising:
   an LED driving module configured to provide a first driving voltage having a voltage value changing over time ranging from a minimum voltage value of Vf1 or less to a maximum voltage value of Vfn or greater; and
   an LED light emitting module comprising a first LED group and a second LED group to an n-th LED group, and configured to receive the first driving voltage from the LED driving module, wherein n is an integer of at least two,
   wherein:
   the LED driving module is configured to drive the LED light emitting module so that the first LED group is turned on when the first driving voltage is Vf1 or greater, drive the LED light emitting module so that the first LED group and the second LED group are connected in series with each other and are turned on when the first driving voltage is Vf2 or greater, and drive the LED light emitting module so that the first LED group to the n-th LED group are connected in series with each other and are all turned on when the first driving voltage is Vfn or greater, wherein Vf1<Vf2<Vfn; and
   the LED driving apparatus further comprises a second driving voltage providing module configured to store a portion of the first driving voltage and selectively provide a second driving voltage to the remaining LED groups except for at least the first LED group of the LED groups, when the first driving voltage is at least Vf1 or less.

2. The LED driving apparatus of claim 1, wherein:
   the first driving voltage is a full-wave rectified alternating current voltage;
   the LED light emitting module comprises a k-th node between a cathode terminal of a k-th LED group and an anode terminal of a k+1-th LED group, wherein 1≤k≤n−1; and
   the second driving voltage providing module further comprises an energy charging and discharging unit connected to the k-th node, and configured to selectively provide the second driving voltage to the k+1-th LED group to the n-th LED group except for the first LED group to the k-th LED group of the LED groups when the first driving voltage is Vfk or less.

3. The LED driving apparatus of claim 2, wherein:
the LED light emitting module further comprises a current blocking unit disposed between the k-th node and the cathode terminal of the k-th LED group; and
the current blocking unit is configured to block a current generated by the second driving voltage from being input to the k-th LED group.

4. The LED driving apparatus of claim 2, wherein the second driving voltage providing module is connected to a first node of the LED light emitting module, and configured to selectively provide the second driving voltage to the second LED group to the n-th LED group except for the first LED group of the LED groups when the first driving voltage is Vf1 or less.

5. The LED driving apparatus of claim 2, wherein:
the second driving voltage providing module further comprises a switch unit configured to control an electrical connection between the energy charging and discharging unit and the k-th node; and
the energy charging and discharging unit enters a charging mode in which a charging is performed by the first driving voltage when the switch unit is in an off-state and enters a discharging mode in which a discharging is performed and the second driving voltage is provided to the LED light emitting module when the switch unit is in an on-state.

6. The LED driving apparatus of claim 5, wherein the switch unit is switched into the on-state when no current flows through the LED light emitting module and is switched into the off-state when the current flowing through the LED light emitting module reaches a set current value.

7. The LED driving apparatus of claim 6, wherein the switch unit is switched into the off-state when a current flowing through any one of the first LED group to the k-th LED group to which the second driving voltage is not provided reaches the set current value.

8. The LED driving apparatus of claim 5, wherein the switch unit is switched into the on-state when the first driving voltage is decreased to Vfk or less and is switched into the off-state when the first driving voltage is increased to Vfk or more.

9. The LED driving apparatus of claim 1, wherein when the second driving voltage providing module stores the portion of the first driving voltage, the second driving voltage providing module further comprises an input current limiting unit configured to uniformly limit a current input to the second driving voltage providing module.

10. A driving method of a light emitting diode (LED) driving apparatus that sequentially drives an LED light emitting module comprising a first LED group and a second LED group to an n-th LED group, using a first driving voltage having a voltage value changed over time, wherein n is an integer of at least two, the driving method comprising:
driving the LED light emitting module so that the first LED group is turned-on when the first driving voltage is Vf1 or greater, driving the LED light emitting module so that the first LED group and the second LED group are connected in series with each other and are turned-on when the first driving voltage is Vf2 or greater, and driving the LED light emitting module so that the first LED group to the n-th LED group are connected in series with each other and are all turned-on when the first driving voltage is Vfn or more, wherein Vf1<Vf2<Vfn;

storing a portion of the first driving voltage in a second driving voltage providing module in an interval in which the first driving voltage is Vf1 or greater; and
selectively providing a second driving voltage output from the second driving voltage providing module to the remaining LED groups except for at least the first LED group of the LED groups when the first driving voltage is Vf1 or less.

11. The driving method of claim 10, wherein:
the first driving voltage is a full-wave rectified alternating current voltage;
the LED light emitting module comprises a k-th node between a cathode terminal of a k-th LED group and an anode terminal of a k+1-th LED group, wherein 1≤k≤n−1,
the second driving voltage providing module comprises an energy charging and discharging unit connected to the k-th node; and
when the first driving voltage is Vfk or less, the second driving voltage is selectively provided to the k+1-th LED group to the n-th LED group except for the first LED group to the k-th LED group of the LED groups.

12. The driving method of claim 11, wherein a current generated by the second driving voltage is blocked from being input to the k-th LED group between the k-th node and the cathode terminal of the k-th LED group.

13. The driving method of claim 11, wherein:
the second driving voltage providing module is connected to a first node of the LED light emitting module; and
when the first driving voltage is Vf1 or less, the second driving voltage is selectively provided to the second LED group to the n-th LED group except for the first LED group of the LED groups.

14. The driving method of claim 11, wherein:
the second driving voltage providing module further includes a switch unit controlling an electrical connection between the energy charging and discharging unit and the k-th node;
the switch unit is switched into an off-state so as to charge the energy charging and discharging unit with the first driving voltage; and
the switch unit is switched into an on-state so as to provide the second driving voltage discharged from the energy charging and discharging unit to the LED light emitting module.

15. The driving method of claim 14, wherein:
a current flowing through the LED light emitting module is detected and when the detected current reaches a set current value, the switch unit is switched into the off-state; and
the current flowing through the LED light emitting module is detected and when no current flows through the LED light emitting module, the switch unit is switched into the on-state.

16. The driving method of claim 15, wherein a current flowing through any one of the first LED group to the k-th LED group to which the second driving voltage is not provided is detected, and when the detected current reaches the set current value, the switch unit is switched into the off-state.

17. The driving method of claim 14, wherein:
when the first driving voltage is increased to Vfk or greater, the switch unit is switched into the off-state; and
when the first driving voltage is decreased to Vfk or less, the switch unit is switched into the on-state.

18. The driving method of claim 10, wherein when the portion of the first driving voltage is stored in the second driving voltage providing module, a current input to the second driving voltage providing module is uniformly limited.

\* \* \* \* \*